(12) United States Patent
Biagiotti

(10) Patent No.: US 6,168,679 B1
(45) Date of Patent: Jan. 2, 2001

(54) METHOD AND DEVICE FOR MEASURING THE DIAMETER OF A ROLL OF WEB MATERIAL

(75) Inventor: Guglielmo Biagiotti, Lucca (IT)

(73) Assignee: Fabio Perini S.p.A., Lucca (IT)

(*) Notice: Under 35 U.S.C. 154(b), the term of this patent shall be extended for 0 days.

(21) Appl. No.: 09/077,325

(22) PCT Filed: Nov. 22, 1996

(86) PCT No.: PCT/IT96/00220
§ 371 Date: May 27, 1998
§ 102(e) Date: May 27, 1998

(87) PCT Pub. No.: WO97/19876
PCT Pub. Date: Jun. 5, 1997

(30) Foreign Application Priority Data

Nov. 28, 1995 (IT) ................................ FI95A0246
Mar. 12, 1996 (IT) ................................ FI96A0043

(51) Int. Cl.[7] .................................. B32B 31/20
(52) U.S. Cl. .......................... 156/64; 156/357; 156/356; 156/361; 156/378; 700/126
(58) Field of Search ............................. 156/64, 351, 356, 156/357, 361, 378, 379, 457; 700/126; 702/157; 226/45, 10; 242/333.5

(56) References Cited

U.S. PATENT DOCUMENTS 4,026,752 * 5/1977 Hartbauer et al. .................... 156/457

FOREIGN PATENT DOCUMENTS 62-264154 * 11/1987 (JP) ............................ B65H 23/198
1-150666 * 6/1989 (JP) .............................. B65H 26/08

* cited by examiner

Primary Examiner—Richard Crispino
Assistant Examiner—George R. Koch, III
(74) Attorney, Agent, or Firm—Breiner & Breiner

(57) ABSTRACT

The method for measuring the diameter of a reel or roll of wound web material (N) involves the following steps: rotating said reel (L); detecting at least twice the moment when a given point (Lf) on the web material (N) passes a predetermined position; determining the time that elapses between said two passes or the amount of rotation (α) of the supporting roller (5); and calculating the diameter (D) of the reel (L) from said time (T) and the peripheral speed (V) of the reel (L) of from said amount of rotation (α) and the radius (R) of the supporting roller (5).

23 Claims, 3 Drawing Sheets

CORRECTION SIGNAL TO REWINDER

METHOD AND DEVICE FOR MEASURING THE DIAMETER OF A ROLL OF WEB MATERIAL

DESCRIPTION

1. Technical Field

The present invention relates to a device and method for measuring the diameter of a roll or reel of web material, for example paper, tissue paper or the like.

More specifically, the invention relates to a device which is especially suitable for incorporating in a gluing machine for gluing the tail end of the web material of the reel.

Gluing machines for these uses are often used in paper conversion lines where one or more large-diameter reels are turned into small rolls of paper, such as toilet paper, absorbent paper for domestic use, paper towels and so forth.

2. Background Art

In conversion lines of this kind there is often a so-called rewinder, that is, a machine that rewinds the web material into reels or rolls whose diameter is equal to the diameter of the finished product. The resulting reels are unloaded from the rewinder and passed to the next working station where the tail end of the wound material is glued down onto the outer surface of the reel, to avoid accidental unwinding during the subsequent processes of cutting the reel up into smaller rolls of the final dimension and packaging them.

There are at present many different kinds of gluing machines for gluing down the free end. Examples of such devices are disclosed in U.S. Pat. Nos. 4,026,752; 4,299,642; 4,475,974; 4,963,223; 5,242,525; in British patents nos. 1,326,043; 2,073,719; in European patent no. 0 481 929 and in the publications of international applications nos. WO-A-9515902 and WO-A-9515903. Many other sorts of gluing machines have been designed, patented and used and those listed above are only a few examples of the types of gluing machines to which the present invention may be applied, as will be seen below.

All the conventional devices known at present use a tail-end unwinding and positioning station, where the tail end of the web material is unwound, by means of various systems, and then gradually rewound by turning the reel on a pair of supporting cylinders, or the like, in the winding direction, so as to position the free end in a predetermined position detected by a sensor. Once the position is correct, the glue is applied to the web material and the free end is rewound. The application of the glue may occur in the same gluing station or in a subsequent station to which the reel is transferred by any means, without losing the reference relating to the position of the tail end. The glue is applied either to the unwound end or to the material that is still wound: the choice makes no difference for the purposes of the present invention, which applies to any gluing machine provided it includes a system for positioning the free end.

One of the critical aspects of the process of converting large-diameter reels into small rolls ready for packaging and sale is the fact that the diameter of the small roll (and hence of the reel formed by the rewinder) must be kept within certain ranges of tolerance to avoid problems during packaging. This is often difficult to achieve because of the fact that the thickness of the web material wound into the large-diameter reel is not constant and is often variable (though the variability is not known a priori) not only from reel to reel, but also within the same reel, from a greater value on the outside to a smaller value on the inside owing to the paper's being crushed. If the parameters applied during rewinding were fixed (the length and tension of the paper, the pressure applied by the movable winding roll, etc.), the reels produced by the rewinder would vary unacceptably in diameter.

It is therefore desirable to read the diameter of the reels as they are produced in order to take swift corrective action on the winding parameters and thus prevent the actual diameter of the reels from becoming too different from the theoretical reference diameter. An example of a rewinding machine and of a winding method that allow the winding parameters to be corrected is disclosed in U.S. Pat. No. 5,267,703. This is based on measuring the diameter by means of a suitable sensor when the reel is still in the rewinder.

OBJECTS OF THE INVENTION

The object of the present invention is to provide a new system of reading the diameter of reels produced by, for example, a reminder, in order to adjust the winding parameters where necessary and correct them in order to keep the diameter within a range of tolerance.

Another object of the present invention is to propose a diameter-reading method and device that can be used on a gluing machine in the paper converting line.

Yet another object of the present invention is to provide a diameter-controlling method and device that can be applied easily to existing plant, with little or no need for mechanical modifications.

Further objects and advantages of the present invention will be evident to those skilled in the art on reading the rest of the text.

DISCLOSURE OF THE INVENTION

In essence, the invention involves measuring the diameter of a reel or roll of wound web material by rotating said reel and detecting at least twice the moment when a given point on the web material passes a predetermined position. The diameter of the reel is worked out from the parameters relating to the rotation of the reel in the interval between the two passes through said predetermined position.

In practice, in one embodiment of the invention the reel can be placed on means of rotation, for example a pair of rolls, that rotate the reel, and that are provided with detection means for determining the amount said means of rotation move in the interval of time between the two moments when said given point on the web material passes said predetermined position. The diameter of the reel can be deduced from the amount of this movement.

If the rotation of the reel is brought about by means of a roll or pair of rolls, the detected movement is represented by the angle of rotation of the roll. Assuming there to be no slippage between reel and roll, the angle of rotation swept by the roll in the interval of time that elapses between the first and the second passes of the given point on the web material through the predetermined position can be used to work out the length of the circumference of the reel and hence its diameter.

In another embodiment, the invention involves measuring the diameter of a reel or roll of wound web material by rotating said reel at a known speed and detecting at least twice the moment when a given point on the web material passes a predetermined position. By measuring the time that elapses between said two passes it is possible to calculate the diameter of the reel from the values of said speed and of said time.

In theory, this method is applicable at any point in a work process in which a reel of web material is produced, or even outside the production process, for example by taking a number of samples and performing the measurements on these. Where the measurement is taken in-line, the measured reading may advantageously be used to modify the winding parameters in order to avoid departing from a predetermined range of tolerance.

The method, which may have a general application, is especially useful in paper conversion lines, as detailed above. To this end it is advantageous to apply the method of the invention at an already existing stage in the conversion process, namely in the stage of positioning the tail end of the web material prior to gluing. In this application the method involves the following steps:
a) opening the tail end of the web material wound around the reel;
b) keeping the reel rotating in the appropriate direction for rewinding the web material, and detecting the moment when a point on the web material (typically the tail end) passes a predetermined position;
c) repeating operations (a) and (b) while measuring a parameter associated with the movement of the reel, for example the time that elapses between the first and the second passes of said point through said position, or the amount of movement of the reel rotating means;
d) calculating the diameter of the reel from said parameter associated with the rotational movement of the reel.

In this form, measuring the diameter takes a very small amount of time corresponding to the second operation of opening and detecting the end of the paper, i.e. the time required to effect one complete revolution of the reel. Moreover, by performing the check not on every reel but on occasional reels only, the time spent positioning the free end twice before gluing it is also cut down. The entire method can be used on existing gluing machines, after modifying the machine's control programme and if necessary modifying the control programme of the rewinder, if it is intended to use the reading taken on the gluing machine to automatically adjust the winding parameters. Herein lies the great advantage of the method of the present invention, which is that it can be implemented very inexpensively and without the need for mechanical modifications to existing lines.

The invention also relates to a device for carrying out the method described above. The device comprises:
means for rotating said reel in the winding direction;
a sensor means for detecting the moment when a point on said web material passes a predefined position; and
control means that calculate the diameter of said reel from a parameter relating to the rotation of the reel, for example from the movement of the reel rotating means or from the values of the speed of rotation of said reel and from the time that elapses between two successive passes of said point through said predefined position.

In practice, because the measurement is advantageously taken by detecting the passing of the tail end of the web material, the device also provides unwinding means for causing the terminal portion of the web material to unwind.

For the reasons explained above, the device in this case advantageously forms an integral part of a gluing machine for gluing the free end of the web material and also serves, therefore, to position the free end before it is glued down.

Other advantageous features of the method and the device according to the invention are indicated in the appended claims.

BRIEF DESCRIPTION OF THE DRAWINGS

A clearer understanding of the invention will be afforded by the description and attached drawing, which latter shows a practical non-restrictive example of the invention. In the drawing.

DETAILED DESCRIPTION OF PREFERRED EMBODIMENTS

The method will now be described in combination with a process of gluing the tail end of the wound web material to the reel, but it should be observed that although this is the preferred form, the method of the invention must not be understood in a restrictive sense. It could also be applied in a separate step prior to gluing, or even be applied in a process in which the tail end is not glued.

Because there are innumerable gluing machines to which the present method can be applied, and since a detailed description of the various mechanical parts of the gluing machine is not essential to an understanding of the present invention, the following account will only refer, in general terms, to the essential elements of the machine. For a more detailed description of a possible machine on which to use the method of the present invention see the earlier patents cited above or others in the same field. Those skilled in the art will be able, on the basis of the following account, to implement the invention on any gluing machine or even on a simpler machine that has only some of the elements of the gluing machine.

Figure 1:
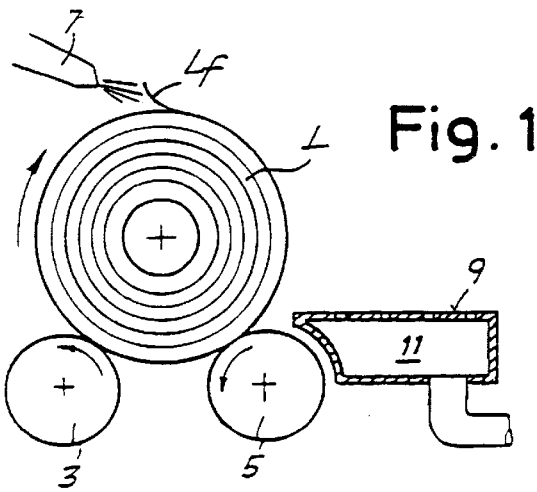
FIGS. 1 to 7 show schematically seven successive steps in the method according to the present invention in one possible embodiment.
Figure 2:
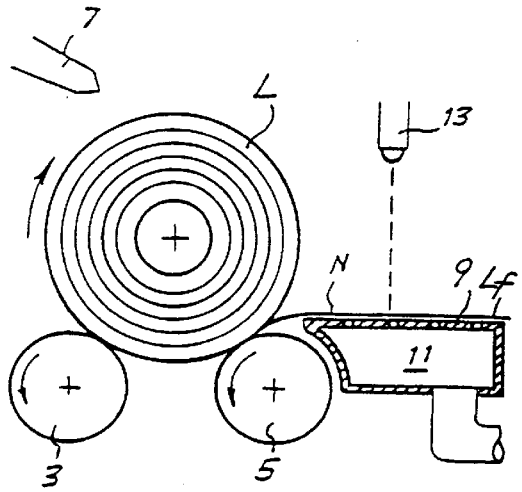

Shown in FIG. 1 is the first step in the process of gluing the tail end Lf of a reel L of web material N. The reel L has been arranged in position and is supported on a pair of cylinders 3 and 5 rotating in the same direction at a known and preferably constant speed. Positioned above the two cylinders 3, 5 is a blowing nozzle 7 which lifts the free end Lf when, as the reel L rotates, this end passes the position shown in FIG. 1. This causes the end Lf and a portion of web material N to unwind and drop onto a surface 9, as shown in FIG. 2. The surface 9 is an upper wall of a vacuum box 11 and is suitably perforated so that the vacuum inside the vacuum box 11 clamps the web material N down on the surface 9.

Figure 3:
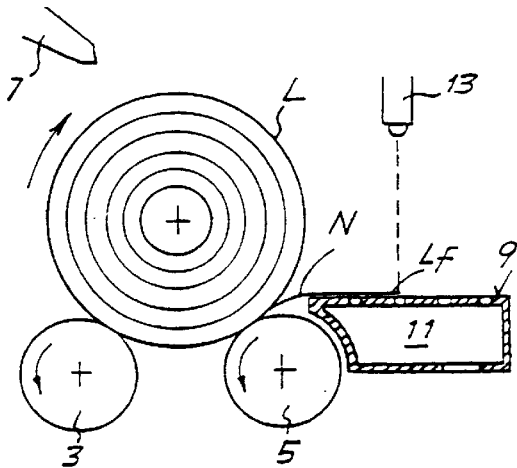

Situated above the supporting surface 9 is an optical sensor or a sensor of other suitable type, schematically marked 13 and, if required, adjustable in terms of position. This sensor detects the passing of the edge of the tail end Lf through a predetermined point on the surface 9. More specifically, the sensor 13 emits a signal at the instant in which the free end Lf is in the position shown in FIG. 3. The tail end Lf reaches this position because the two cylinders 3 and 5 are still rotating and thus gradually rewinding the tail end Lf.

Figure 4:
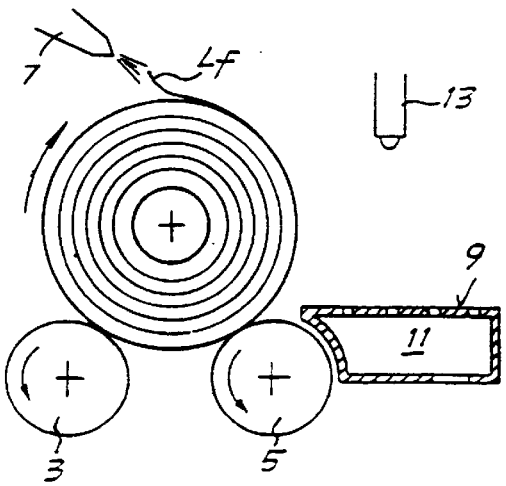
Figure 5:
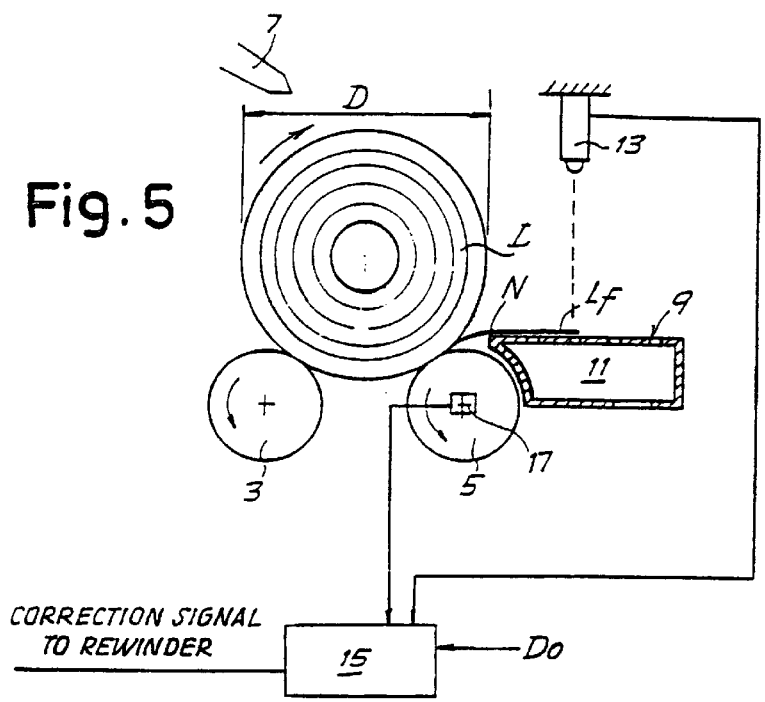

The description given thus far corresponds to the normal step of positioning the tail and Lf of a reel L in a gluing machine of conventional type. Whereas in conventional gluing machines the positioning step is now complete and the reel moves on to the gluing step, the invention, by contrast, involves continuing to turn the cylinders 3 and 5 until the same operation described above has been repeated a second time. This is shown in the following FIGS. 4 and 5.

Since the speed of rotation of the cylinders 3 and 5 is known, and hence the peripheral speed V of the reel L is also known (on the reasonable assumption that there is no slippage between the reel L and the cylinders 3 and 5), reading the interval of time T that elapses between the first signal emitted by the sensor 13 (at the instant shown in FIG. 3) and the second signal emitted by the same sensor (at the instant shown in FIG. 5), it is possible to calculate the diameter D of the reel to a high degree of precision, using the equation:

$$D=V*T/\pi$$

A central processing unit 15 (shown for simplicity's sake only in FIG. 5), which receives the two successive signals from the sensor 13 and knows the speed of rotation of the cylinders 3 and 5, is able to compute the diameter D before the subsequent operations are performed on the reel L. If the calculated value of the diameter D is outside the permitted range of tolerance about a theoretical value Do, the central processing unit 15 sends to the rewinder (or to some other central processing unit controlling the rewinder, not shown) a correction signal to modify the winding parameters. This correction will of course only affect reels coming after the one being measured and those produced in the meantime, but it is sufficient to avoid excessive departures from the theoretical value Do.

Because calculating the diameter D requires doubling the amount of time required to position the tail end Lf, it is preferable to run the diameter check not on every reel but only on some, for example one in every ten. This makes the checking time practically negligible and enables the gluing machine to absorb the output of the upstream rewinder without any problems (or the fraction of output fed to it, in the case in which several gluing machines are provided for one rewinder). The intermittent check on some of the reels rather than all is still sufficient to ensure that the diameter tolerance is kept to with appropriate corrections of winding parameters.

Figure 6:
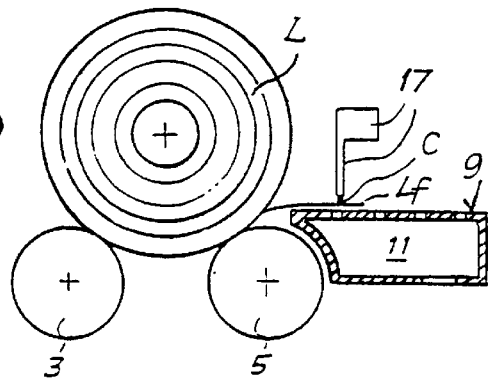
Figure 7:
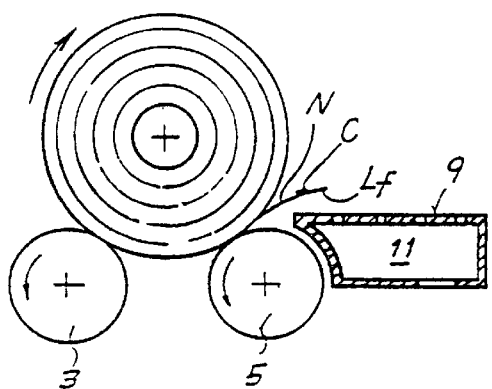

After measuring the diameter and placing the tail end Lf in position, the glue is applied, which operation, in the example discussed, is shown in FIG. 6. The glue C is applied by a nozzle 17 moving parallel to the axis of the reel L. Application may take place in the same station in which positioning was carried out or in a different station, and may be performed by a moving nozzle (as shown in the example) or by other known systems, for example by rolling the reel over a surface along which runs a slot through which the adhesive is dispensed, or by some other means. The method of transferring the reel to the gluing station for glue application, as well as the subsequent operation of closing the tail end, shown schematically in FIG. 7, are irrelevant for the purposes of the present invention.

In another embodiment of the invention, an encoder 17 connected to one of the two rolls 3, 5 (shown only in FIG. 5 for simplicity's sake, where it is connected to the roll 5) detects the angle through which the roll 5 turns in the interval of time that elapses between the first and the second readings taken by the sensor 13. Given the diameter of the roll 5 and assuming no slippage between the reel L and the roll 5 (e.g. by giving the roll 5 a coating with a high coefficient of friction), the angle detected by the encoder 17 can be used to derive the diameter D of the reel L using the formula:

$$D=\alpha R/\pi$$

in which R is the radius of the roll 5 and α is the angle detected by the encoder 17 expressed in radians. The value αR effectively represents the integral of the peripheral speed of the roll 5 in the interval of time between the two moments when the tail end Lf passes in front of the sensor 13.

Figure 8:
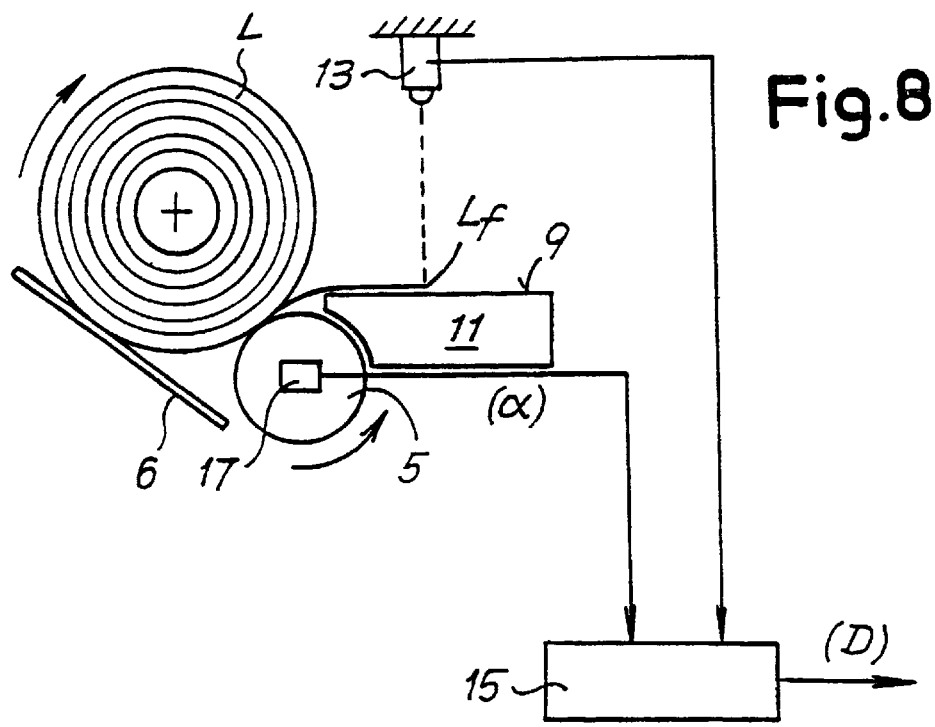
FIGS. 8 and 9 show two modified embodiments.

In the embodiment shown in FIG. 8 the reel rotating means consist of a single driven roll 5 and an inclined supporting plane 6 with a low coefficient of friction, for example coated in some suitable synthetic resin. An encoder 17 is connected to the driven roll 5 to detect the angle of rotation a of the roll. The signals from the encoder 17 and sensor 13 are sent to the central processing unit 15. The operation is much as has been described above. Rather than an angular encoder 17, the angle of rotation can be measured by a measuring technique based on the time and speed, similar to the technique described previously.

Figure 9:
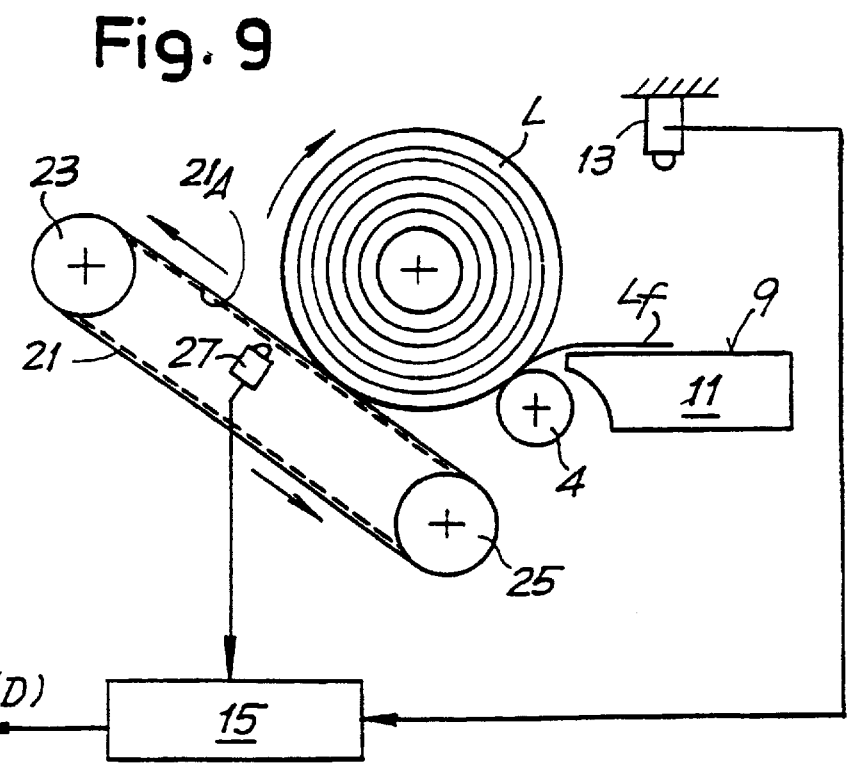

FIG. 9 shows an embodiment in which the reel L is caused to rotate by a belt 21 running around two pulleys 23, 25. The reel L presses on the belt 21 and on an idle roll 4, though the latter could be replaced by a supporting surface similar to the surface 6 in FIG. 8. The central processing unit 15 receives a signal representing movement or speed which may be produced by an encoder and taken from one of the pulleys 23, 25 around which the belt 21 travels. Conversely the signal may be obtained from a sensor 27 that reads a series of equidistant reference marks 21A on one of the surfaces of the belt 21 or other references suitable for providing information on the movement of the belt. This datum can be used in one of the ways already described to work out the diameter of the reel L.

The embodiments described herein may be variously combined with each other.

It should be understood that the drawing shows only an example given purely by way of a practical demonstration of the invention, it being possible for this invention to be varied as regards shapes and arrangements without, however, departing from the scope of the concept underlying the invention. The presence of any reference numerals in the accompanying claims is for the purpose of faciliting the reading of the claims with reference to the description and to the drawing, and does not limit the scope of protection represented by the claims.

What is claimed is:

1. Method for measuring a diameter of a roll of wound web material comprising rotating said roll of wound web material; detecting at least twice a moment when a given point on the web material passes a predetermined position; and calculating the diameter of the roll from at least one parameter of said rotation.

2. Method according to claim 1, further comprising determining elapsed time between said detecting at least twice the given point on the web material, and then determining the diameter of the roll from speed of rotation of the roll and said elapsed time.

3. Method according to claim 1 wherein said rotating of said roll includes placing said roll in contact with a means of rotation that causes the roll to rotate; determining a length of circumference of the roll, and hence the roll's diameter, based on an amount of movement of said means of rotation between said detecting at least twice said given point.

4. Method according to claim 1, 2 or 3, further comprising
   (a) opening a tail end of the web material wound around the roll;
   (b) keeping the roll rotating in an appropriate direction for rewinding the web material, and detecting the moment when said given point of the web material passes said predetermined position;
   (c) repeating operations (a) and (b) while measuring said at least one parameter relating to rotation of the roll between first and second passes of said given point through said predetermined position; and
   (d) calculating the diameter of the roll from said at least one parameter.

5. Method according to claim 4, wherein said at least one parameter is represented by an amount which the means of rotation moves between said first and second passes.

6. Method according to claim 4, wherein said at least one parameter is represented by time which elapses between said first and second passes, and speed of rotation of the roll is known.

7. Method according to claim 4, wherein said method is performed as one step in a process of positioning and gluing the tail end of the web material wound onto said roll.

8. Method according to claim 4, wherein said given point on the web material is represented by an edge of the tail end of the web material.

9. Method according to claim 8 further comprising comparing the diameter measured with a reference value and generating a signal to correct roll winding parameters when the diameter measured is outside a predetermined range of tolerance for the reference value.

10. Method according to claim 4, further comprising
conveying a series of rolls one by one to a device for gluing the tail end of each roll; and
measuring the diameter of some but not all of the rolls conveyed one by one.

11. Method according to claim 10 further comprising comparing the diameter measured with a reference value and generating a signal to correct roll winding parameters when the diameter measured is outside a predetermined range of tolerance for the reference value.

12. Method according to claim 4 further comprising comparing the diameter measured with a reference value and generating a signal to correct roll winding parameters when the diameter measured is outside a predetermined range of tolerance for the reference value.

13. Method according to claims 1, 2 or 3 further comprising comparing the diameter measured with a reference value and generating a signal to correct roll winding parameters when the diameter measured is outside a predetermined range of tolerance for the reference value.

14. Device for measuring a diameter of a roll of wound web material comprising
means for rotating said roll in a winding direction;
a sensor means for detecting a moment when a given point on said web material passes a predefined position; and
control means that calculates the diameter of said roll from a parameter relating to rotation of said roll between two successive passes of said given point through said predefined position.

15. Device according to claim 14, wherein said control means is programmed to calculate said diameter from speed of the rotation of the roll and from time that elapses between said two successive passes.

16. Device according to claim 14, wherein said control means is programmed to calculate said diameter from an amount which said means for rotating said roll moves in order to rotate said roll, a detection means being provided to determine movement of said means for rotating said roll.

17. Device according to claim 14, 15 or 16 further comprising unwinding means for unwinding a terminal portion of the wound web material.

18. Device according to claim 17, wherein said device is part of a gluing apparatus for gluing a tail end of the web material wound on said roll; said means for rotating said roll, said unwinding means and said sensor means constituting means for positioning the tail end of the web material for subsequent gluing by a dispenser of glue.

19. Device according to claim 16, wherein said means for rotating said roll comprises at least one roller with which the roll is brought into contact, and said detection means detects an angle of rotation of said roller between said two successive passes of said given point through the predefined position.

20. Device according to claim 16, wherein said means for rotating said roll comprises an endless flexible element and said detection means detects speed or movement of said flexible element.

21. Gluing device for gluing tail ends of a series of rolls of wound web material comprising means programmed to carry out, on at least some of said rolls, two consecutive positionings of a same roll and, measuring a parameter relating to rotation of each roll between said two consecutive positionings, and calculating a diameter of the roll so positioned based thereon.

22. Gluing device according to claim 21, wherein said means programmed is programmed to determine elapsed time between said two consecutive positionings and to calculate said diameter from said elapsed time and speed of rotation of the roll.

23. Gluing device according to claim 21, wherein said means programmed is programmed to determine an amount of rotation of a roll between said two consecutive positionings and to calculate said diameter from said amount of rotation.

\* \* \* \* \*